United States Patent
Sato et al.

(10) Patent No.: US 7,638,239 B2
(45) Date of Patent: Dec. 29, 2009

(54) NEGATIVE ELECTRODE FOR NON-AQUEOUS ELECTROLYTE SECONDARY BATTERY, MANUFACTURING METHOD THEREFOR, AND NON-AQUEOUS ELECTROLYTE SECONDARY BATTERY

(75) Inventors: Toshitada Sato, Osaka (JP); Yasutaka Kogetsu, Suita (JP); Hiroshi Yoshizawa, Hirakata (JP)

(73) Assignee: Panasonic Corporation, Osaka (JP)

( * ) Notice: Subject to any disclaimer, the term of this patent is extended or adjusted under 35 U.S.C. 154(b) by 898 days.

(21) Appl. No.: 11/289,681

(22) Filed: Nov. 30, 2005

(65) Prior Publication Data
US 2006/0121351 A1   Jun. 8, 2006

(30) Foreign Application Priority Data
Dec. 8, 2004   (JP)   ............... 2004-355689

(51) Int. Cl.
*H01M 4/58* (2006.01)
(52) U.S. Cl. ............. 429/218.1; 429/245; 429/233; 429/231.95; 429/128
(58) Field of Classification Search ............ 429/218.1, 429/245, 233, 231.95, 128
See application file for complete search history.

(56) References Cited

U.S. PATENT DOCUMENTS

| 6,844,113 B2 * | 1/2005 | Yagi et al. ............ 429/233 |
| 2004/0234864 A1 * | 11/2004 | Kubota ............ 429/218.1 |

FOREIGN PATENT DOCUMENTS

| JP | 2002-083594 | 3/2002 |
| JP | 2002-373644 | 12/2002 |
| JP | 2003-217576 | 7/2003 |
| JP | 2003-308832 | 10/2003 |

* cited by examiner

*Primary Examiner*—Laura S Weiner
(74) *Attorney, Agent, or Firm*—McDermott Will & Emery LLP (57) ABSTRACT

In a negative electrode for a non-aqueous electrolyte secondary battery including an active material portion capable of electrochemically absorbing and desorbing Li, a current collector carrying the active material portion, and a buffer interposed between the active material portion and the current collector, the active material portion includes at least one selected from the group consisting of a Si simple substance, a Si alloy, and a Si compound, the current collector includes Cu, and the buffer has a first layer contacting the current collector and including a group A element which is at least one selected from the group A consisting of Sn, Al, and In, and a second layer contacting the active material portion and including a group B element which is at least one selected from the group B consisting of transition metal elements other than Cu.

5 Claims, 2 Drawing Sheets

NEGATIVE ELECTRODE FOR NON-AQUEOUS ELECTROLYTE SECONDARY BATTERY, MANUFACTURING METHOD THEREFOR, AND NON-AQUEOUS ELECTROLYTE SECONDARY BATTERY

FIELD OF THE INVENTION

The present invention relates to a non-aqueous electrolyte secondary battery, which has a high capacity and a long life, particularly to a negative electrode therefor. The negative electrode of the present invention comprises an active material portion capable of electrochemically absorbing and desorbing Li, a current collector carrying the active material portion, and a buffer interposed between the active material portion and the current collector.

BACKGROUND OF THE INVENTION

So far, many researches and developments for the usage of lithium metal, which can actualize a high energy density with a high voltage, for a negative electrode of a non-aqueous electrolyte secondary battery have been conducted. However, a battery excellent in cycle life and safety is not easily obtained. Thus, presently, lithium ion secondary batteries in which a graphite type carbon material capable of reversibly absorbing and desorbing lithium is used for the negative electrode are available in practical use.

However, the theoretical capacity of graphite is 372 mAh/g. The batteries available in practical use already utilize a capacity of about 350 mAh/g. Therefore, the usage of carbon material does not meet the expectation of realizing a non-aqueous electrolyte secondary battery with sufficient capacity as a future energy source of high-performance mobile devices. For achieving a further higher capacity, a negative electrode material having a theoretical capacity higher than that of graphite is necessary.

Thus, alloy materials including silicon or tin are gaining attention. Silicon and tin are capable of electrochemically absorbing and desorbing lithium ion. Silicon and tin also have a much higher capacities compared with that of graphite. For example, theoretical discharge capacity of silicon is 4199 mAh/g, about 11 times higher than that of graphite.

However, alloy materials form alloys such as a lithium-silicon alloy and a lithium-tin alloy when absorbing lithium. Therefore, crystal structure of the alloy materials changes along with charge and discharge. The changes in crystal structure involve a great deal of change in volume. For example, the volume of silicon theoretically expands to 4.1 times more, when silicon absorbs lithium to the maximum. Thus, an active material comprising alloy material easily separates from the current collector. As a result, electric conductivity in the negative electrode is lost, to greatly deteriorate high-rate discharge characteristic and charge and discharge cycle characteristic. On the other hand, when graphite absorbs lithium, lithium is intercalated between graphite layers. Such intercalation reaction only expands the volume of graphite to 1.1 times.

Japanese Laid-Open Patent Publication No. 2002-83594 (D1) proposed a negative electrode comprising an active material portion composed of amorphous silicon on a current collector with roughened surface to cope with the expansion of the negative electrode material. By roughening the surface of current collector, the bond between the active material portion and the current collector becomes stronger. Additionally, the active material portion cracks along the roughened surface to form columnar particles. Such columnar particles can decentralize the expansion stress. However, on the interface between the active material portion that expands and the current collector, cracks and destruction easily occur due to the difference in stress. Therefore, some means for decreasing the interface stress are necessary. Thus, forming a buffer on the interface is proposed by heating the negative electrode to disperse Cu forming the current collector to the active material portion.

However, in such heating, controlling the Cu diffusion is extremely difficult. When Cu is diffused in excess, an inactive phase which does not react with Li increases in the active material portion, to decrease battery capacity. On the other hand, when the diffusion of Cu is too small, the active material portion cannot endure the expansion stress. Thus, cracks and destruction occur on an interface between the active material portion and the current collector.

Japanese Laid-Open Patent Publication No. 2003-217576 (D2) proposes to produce CuO by oxidizing the current collector surface, and then form a film of active material portion comprising Si on the surface. CuO suppresses the excessive diffusion of Cu. Japanese Laid-Open Patent Publication No. 2003-308832 (D3) proposes to form Si films on both sides of the current collector simultaneously by sputtering. This proposal intends to make thermal hysteresis even on front and reverse sides of the current collector to suppress the diffusion. Further, in Japanese Laid-Open Patent Publication No. 2002-373644 (D4), excessive diffusion of the constituent element of current collector is prevented by forming an intermediate layer comprising Mo or W on the current collector surface.

In the proposals of D2 to D4, control of the diffusion of elements becomes easier compared with the heating process proposed in D1. However, the fundamental problems are not resolved, that is, the heating process which cannot be controlled easily is necessary. Further, the proposal of D2 has the demerit of higher resistance, since CuO is formed on the interface. In the proposal of D3, the sputtering involves a large-scale process, to drastically increase the process cost. In the proposal of D4, the heating temperature to bond the active material and the intermediate layer is high. Thus, the active material of micro crystalline or amorphous state is crystallized by the heating process, to deteriorate the electrode performance.

SUMMARY OF THE INVENTION

An object of the present invention is to reinforce the interface between the active material portion and the current collector, in a negative electrode for a non-aqueous electrolyte secondary battery having an active material portion including silicon capable of achieving high capacity, and a current collector including Cu and carrying the active material portion. According to the present invention, a strong bond on the interface can be easily achieved.

The present invention relates to a negative electrode for a non-aqueous electrolyte secondary battery, comprising: an active material portion capable of electrochemically absorbing and desorbing Li, a current collector carrying the active material portion, and a buffer interposed between the active material portion and the current collector. The active material portion comprises at least one selected from the group consisting of a simple substance of Si (a Si simple substance), a Si alloy, and a Si compound. The current collector comprises Cu. The buffer comprises a first layer and a second layer. The first layer is in contact with the current collector and includes a group A element which is at least one selected from the group A consisting of Sn, Al and In. The second layer is in contact with the active material portion and includes a group B element which is at least one selected from the group B consisting of transition metal elements other than Cu.

The first layer preferably includes at least Sn as the group A element, and the second layer preferably includes at least Ni as the group B element.

When the first layer includes at least Sn as the group A element, a phase including Cu and Sn is preferably formed in the first layer, the Cu being diffused from the current collector to the first layer.

When the second layer includes at least Ni as the group B element, a phase including Si and Ni is preferably formed in the second layer, the Si being diffused from the active material portion to the second layer.

The present invention also relates to a non-aqueous electrolyte secondary battery comprising a positive electrode capable of electrochemically absorbing and desorbing Li, a negative electrode, and a non-aqueous electrolyte. The negative electrode includes an active material portion capable of electrochemically absorbing and desorbing Li, a current collector carrying the active material portion, and a buffer interposed between the active material portion and the current collector. The active material portion includes at least one selected from the group consisting of a simple substance of Si, a Si alloy, and a Si compound. The current collector comprises Cu. The buffer comprises a first layer and a second layer. The first layer is in contact with the current collector and includes a group A element which is at least one selected from the group A consisting of Sn, Al, and In. The second layer is in contact with the active material portion and includes a group B element which is at least one selected from the group B consisting of transition metal elements other than Cu.

The present invention also relates to a method for manufacturing a negative electrode for a non-aqueous electrolyte secondary battery, the method comprising a first step for preparing a laminated sedimentary layer, and a second step for heating the laminated sedimentary layer.

The first step comprises the steps of: depositing a first layer including a group A element which is at least one selected from the group A consisting of Sn, Al, and In on the current collector comprising Cu; depositing a second layer including a group B element which is at least one selected from the group B consisting of transition metal elements other than Cu on the first layer; and depositing at least one selected from the group consisting of a simple substance of Si, a Si alloy, and a Si compound on the second layer.

In the second step, the laminated sedimentary layer is preferably heated at a temperature of 150 to 700° C. in a non-oxidative atmosphere together with the current collector carrying the laminated sedimentary layer.

According to the present invention, the bond on the interface between the active material portion and the current collector can be made stronger easily. Additionally, the heating process to diffuse Cu from the current collector to the active material portion, which is extremely difficult to control, becomes unnecessary. Therefore, the capacity of the active material portion does not decrease greatly. Thus, a non-aqueous electrolyte secondary battery with high capacity and long life can be achieved.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

A negative electrode for a non-aqueous electrolyte secondary battery of the present invention comprises an active material portion capable of electrochemically absorbing and desorbing Li, a current collector carrying the active material portion, and a buffer interposed between the active material portion and the current collector.

The active material portion comprises at least one selected from the group consisting of a simple substance of Si (a Si simple substance), a Si alloy, and a Si compound. Any of a Si simple substance, a Si alloy, and a Si compound can be used alone, or can be used in combination. The active material portion may include a component other than a Si simple substance, a Si alloy, and a Si compound: for example, a small amount of impurities. The active material portion is preferably in the form of a sedimentary layer including at least one selected from the group consisting of a Si simple substance, a Si alloy, and a Si compound.

The current collector comprises Cu. The current collector may comprise a simple substance of Cu, or an alloy of Cu and a metal other than Cu. The current collector may include a small amount of component other than metals. For the component other than Cu, elements such as P, Ag, and Cr can be mentioned, for example. These elements improve the strength or flexibility of the current collector. The Cu content in the current collector is preferably 90 wt % or more. The form of the current collector is not limited as long as the current collector has a portion that is capable of carrying the active material portion, but is preferably in the form of a sheet or a belt-like shape. The surface of the current collector may be flat or uneven, and may be punched or have slits. The current collector may be processed three-dimensionally to have a certain apparent thickness.

The buffer comprises a first layer being in contact with the current collector, and a second layer being in contact with the active material portion.

The first layer contacting the current collector includes a group A element which is at least one selected from the group A consisting of Sn, Al, and In. The first layer may include an element diffused from the adjacent current collector or second layer. The first layer may comprise substantially a group A element alone, or may include a component other than the group A element, in addition to the elements diffused from the adjacent current collector or second layer. For such component other than the group A element, Zn, P, B, O, N and the like can be mentioned, and the amount thereof is preferably below 10 wt % relative to the first layer as a whole.

The second layer contacting the active material portion includes a group B element which is at least one selected from the group B consisting of transition metal elements other than Cu. One kind or plurality of kinds of transition metal element other than Cu may be included in the second layer. The second layer may include an element diffused from the adjacent active material portion or first layer. The second layer may comprise substantially a group B element alone, or may include a component other than the group B element, in addition to the element diffused from the adjacent active material portion and first layer. For the component other than the group B element, Zn, P, B, O, N, and the like may be mentioned, and a preferable amount thereof is below 10 wt % relative to the second layer as a whole.

Figure 1:
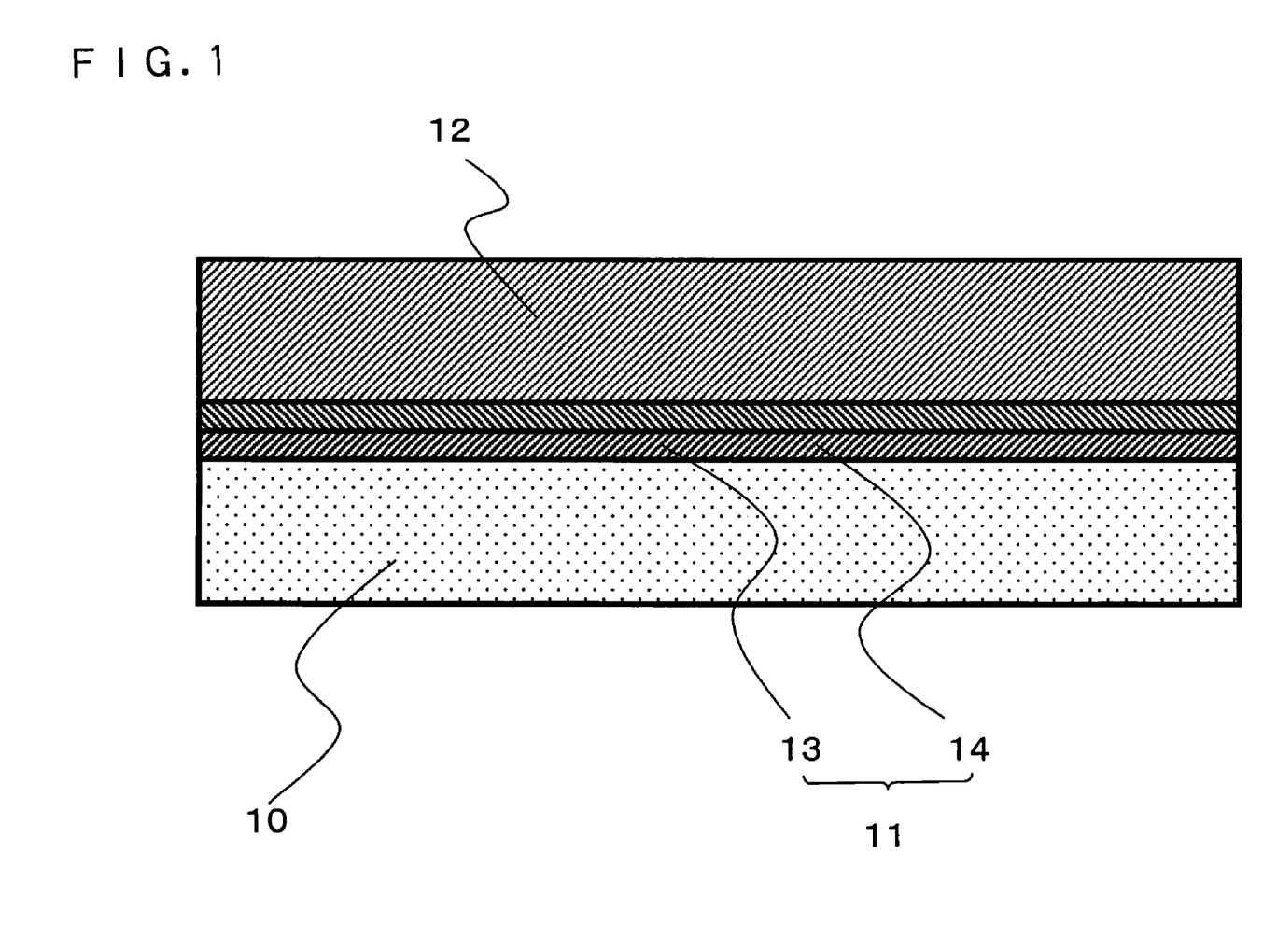
FIG. 1 is a schematic illustration of a structure of a negative electrode of the present invention.

A schematic vertical cross section of a negative electrode of the present invention is shown in FIG. 1.

An active material portion 10, a buffer 11, and a current collector 12 are bonded together. The bonds between these constituents are made stronger by heating them at a temperature of 100° C. to 500° C. A first layer 13 and a second layer 14 are also bonded together. The bond between the first layer and the second layer is made stronger by heating them at a temperature of 300° C. to 700° C.

The above first and second layers are disposed as a buffer between the active material portion and the current collector comprising Cu. By providing such buffer, an excessive diffusion of Cu from the current collector to the active material portion, and a diffusion of Si from the active material portion to the current collector can be suppressed, even at the time of the heating to obtain a stronger bond between the constituents. Further, the bond between the active material portion and the current collector can be made extremely stronger.

Any of the group A element, which is at least one selected from the group A consisting of Sn, Al, and In, included in the first layer contacting the current collector is a metal with a low melting point. The group A element and Si do not produce an intermetallic compound or a solid solution until both of the group A element and Si are molten together. Thus, the second layer functions as a barrier to suppress the diffusion of Si in the active material portion to the current collector.

On the other hand, the group A element reacts with Cu, which is the main constituent element of the current collector, to produce an intermetallic compound or a solid solution even at a comparatively low temperature of 100° C. to 500° C. Therefore, on the interface between the current collector and the first layer, a strong bond can be achieved at a comparatively low temperature.

The group B element included in the second layer contacting the active material portion is a transition metal element other than Cu, and forms a silicide compound with Si included in the active material portion. Thus, a strong bond can be achieved on the interface between the active material portion and the second layer. Additionally, the group B element reacts with the group A element in the first layer to produce an intermetallic compound or a solid solution easily. Thus, the bond between the first layer and the second layer also can be secured strong.

On the other hand, in general, the group B element hardly forms an alloy with Cu, which is the main constituent element of the current collector, unless under a high temperature. Thus, the first layer works as a barrier to suppress the diffusion of Cu from the current collector to the active material portion.

As explained in the above, the first layer and the second layer respectively suppress the diffusion of Cu and Si between the active material portion and the current collector. Moreover, a strong bond can be achieved between the current collector and the first layer, between the first layer and the second layer, and between the second layer and the active material portion, at a comparatively low temperature. Thus, according to the structure of the present invention, a strong bond between the active material portion and the current collector can be achieved, while maintaining a high capacity. Additionally, according to the structure of the present invention, a careful temperature control is unnecessary for the bonding between the current collector and the first layer, between the first layer and the second layer, and between the second layer and the active material portion. Even without the careful temperature control, a decline in capacity of the active material portion due to an excessive diffusion of an element can be prevented.

The group A element included in the first layer preferably includes at least Sn. Sn does not form an intermetallic compound with Si easily. Additionally, an alloy is not formed until both Sn and Si are molten together.

The group B element included in the second layer preferably includes at least Ni. Among the transition metal elements, Ni does not form an intermetallic compound easily with Cu. Additionally, an alloy is not formed until both Ni and Cu are molten together.

When the first layer includes Sn and the second layer includes Ni, Ni easily forms an alloy with Si in the active material portion, and with Sn in the first layer. Additionally, Sn easily forms an alloy with Ni in the second layer and with Cu in the current collector. Thus, an element included in the first layer and in the second layer respectively is formed into an alloy easily, with elements included in adjacent layers. Thus, strong bonds are formed between the layers. Therefore, on the whole, a strong bond between the active material portion and the current collector can be achieved.

When Sn is included in the first layer, the amount of Sn is desirably regulated as appropriate. For example, the amount of Sn is preferably regulated to be 20 wt % to 80 wt % relative to the first layer as a whole. Additionally, when the second layer includes Ni, it is desirable that the amount of Ni is regulated as appropriate. For example, the amount of Ni is preferably regulated to be 20 wt % to 80 wt % relative to the second layer as a whole. When Sn and Ni are included in the first layer and the second layer in an appropriate amount, respectively, an excessive diffusion of elements between the active material portion and current collector can be prevented effectively.

When the first layer includes at least Sn as the group A element, a phase including Cu diffused from the current collector and Sn is preferably formed in the first layer. Herein, a phase including Cu and Sn is an alloy phase of Cu and Sn, $Cu_6Sn_5$, $Cu_3Sn$, and the like. The alloy phase includes an intermetallic compound phase of Cu and Sn, and a solid solution phase in which Sn is dissolved in Cu, or in which Cu is dissolved in Sn. A single phase or a plurality of phases may be included in the first layer. Usually, such phases are included in the first layer as an island having a particle size of 0.01 to 1 μm, or the entire first layer is composed of such phases.

When the second layer includes at least Ni as the group B element, a phase including Si diffused from the active material portion and Ni is preferably formed in the second layer.

Herein, the phase including Si and Ni may be an alloy phase of Si and Ni, $NiSi_2$, $Ni_3Si_4$, and the like. The alloy phase includes an intermetallic compound phase of Si and Ni, and a solid solution phase in which Ni is dissolved in Si, or in which Si is dissolved in Ni. A single phase or a plurality of phases may be included in the second layer. Such phases are usually included in the second layer as an island having a particle size of 0.01 μm to 1 μm, or the entire second layer is composed of such phases.

The phase including Cu and Sn, and the phase including Si and Ni make the bond between the current collector and the first layer and between the second layer and the active material portion stronger, respectively. Thus, a separation of the active material portion from the current collector is suppressed.

The active material portion comprises at least one selected from the group consisting of a Si simple substance, a Si alloy, and a Si compound as an active material. The active material desirably comprises a micro crystalline or an amorphous region. When the active material is crystalline, active material particles become prone to cause cracks as Li is absorbed therein. A great degree of cracks of the active material particles cause rapid decline of current collection capability, to deteriorate the battery performance. On the other hand, when a micro crystalline or an amorphous active material is used, cracks of the active material particles due to the expansion involved with the absorption of Li will not occur so easily. The active material may include both micro crystalline region and amorphous region.

In the present invention, the active material having crystal grains (crystallites) with a diameter of 50 nm or below is defined as micro crystalline. When the active material has the micro crystalline region, in the X-ray diffraction spectrum of the alloy particles, at least one peak can be observed. The peak is not sharp but somewhat clear to the extent that a half-width can be obtained. The diameter of crystal grains (crystallites) of the active material can be calculated from the half-width of the peak with the largest intensity among the X-ray diffraction spectrum of the active material, and the Scherrer formula.

When the active material has an amorphous region, at a region where $2\theta=15$ to $40°$ in the X-ray diffraction spectrum of the active material, a broad halo pattern can be observed. From the halo pattern, the half-width can not be recognized.

For the Si alloy as an active material, an intermetallic compound including Si, a solid solution composed of Si as a solvent, and the like can be mentioned. But any state of the Si alloy can be used. The Si alloy with a plurality of states may be used simultaneously. As described above, the intermetallic compound and the solid solution are desirably micro crystalline or amorphous. The micro crystalline or amorphous state renders battery performance particularly excellent.

In the Si alloy as an active material, a metal element to form an alloy with Si is not particularly limited. Examples of such element include transition metal elements, particularly Ti and Zr. Such elements may be included in the alloy singly or in any combination.

For the Si compound as an active material, oxides including Si, nitrides including Si, sulfides including Si may be mentioned. These compounds may be used singly, or in any combination. Among the Si compounds, oxides including Si are preferable. An oxide represented by the chemical formula: $SiO_x (x<2)$ is particularly preferable.

Although the thickness of the active material portion is not particularly limited in the present invention, the thickness is desirably 0.1 μm or more, and 100 μm or less in the completely discharged state (right after the fabrication of the negative electrode). When the active material portion has a thickness of below 0.1 μm, the active material portion is too thin compared with the thickness of the current collector, which may cause an extremely low battery capacity. On the other hand, when the active material portion has a thickness of 100 μm or more, an electrolyte is less prone to reach the proximity of the current collector. Thus, the whole active material cannot contribute to the reaction, whereby the capacity is decreased.

The active material portion with a thickness in the ranges below can bring out the characteristics of the present invention to the maximum.

When a simple substance of Si is used as an active material, the thickness of the active material portion is preferably 1 μm or more and 20 μm or less under the completely discharged state, and particularly preferably 3 μm or more and 10 μm or less.

When a Si alloy is used as an active material, the thickness of the active material portion is preferably 1 μm or more and 40 μm or less under the completely discharged state.

When a Si compound is used as an active material, the thickness of the active material portion is preferably 5 μm or more and 50 μm or less under the completely discharged state.

The current collector preferably has a thickness of 6 μm or more and 40 μm or less. The current collector with a thickness less than 6 μm may cause handling difficulties. Also, a thin current collector is hard to maintain necessary strength, and may be damaged by expansion and contraction of active material portion involved in charge and discharge reactions. Battery performance declines when the negative electrode is cut or wrinkled. On the other hand, when the current collector with a thickness exceeding 40 μm is used, the volume occupied by the current collector in a battery increases and the capacity decreases. Additionally, since a thick current collector is hard to bend, its handling may be difficult.

In the buffer, the first layer and the second layer preferably have a thickness of 0.01 μm or more and 3 μm or less, respectively. When the layers have a thickness less than 0.01 μm, the Si and Cu diffusion cannot be suppressed easily between the active material portion and the current collector, and Si and Cu may be bonded. On the other hand, when the thickness of each layer exceeds 3 μm, more elements are diffused from the current collector to the first layer, and from the active material portion to the second layer, to cause a decrease in capacity. The buffer is not involved in charge and discharge reactions. Thus, an increase in the volume of the buffer causes a decrease in battery capacity. Particularly, it is preferable that the thickness of the first layer and the second layer respectively is 0.1 μm or more and 1 μm or less.

In the following, an example of a method for manufacturing a negative electrode of the present invention is explained. Based on the method below, a negative electrode of the present invention can be fabricated easily with low cost. The method includes a first step in which a laminated sedimentary layer (a precursor of a negative electrode) is fabricated, and a second step in which the laminated sedimentary layer is heated.

In the first step, on a current collector including Cu, a first layer including a group A element which is at least one selected from the group A consisting of Sn, Al, and In is deposited. Although the method for depositing the first layer is not particularly limited, the layer can be formed by vacuum processes such as a vacuum deposition method, a sputtering method, and a CVD (chemical vapor deposition) method, or by plating, for example. These methods are superior in terms of film processability and thickness control.

Then, on the first layer, a second layer including the group B element which is at least one selected from the group B consisting of transition metal elements other than Cu is deposited. Although the method for depositing the second layer is not particularly limited, the layer can be formed by vacuum processes such as a vacuum deposition method, a sputtering method, and a CVD (chemical vapor deposition) method, or by plating, for example. These methods are superior in terms of film processability and thickness control.

Next, the active material portion is formed on the second layer by depositing at least one selected from the group consisting of a simple substance of Si, a Si alloy, and a Si compound. Although the method for forming the active material portion is not particularly limited, the portion can be formed preferably by vacuum processes such as a vacuum deposition method, a sputtering method, and a CVD (chemical vapor deposition) method. By using vacuum processes, impurities are prevented from intrusion. As a result, battery performance also improves. Additionally, as for the method other than the vacuum process, thermal spraying and shot peening can be used. In shot peening, the active material portion is formed by shooting particles of a simple substance of Si, a Si alloy, or/and a Si compound onto the current collector surface.

In the second step, the laminated sedimentary layer obtained in the first step is heated. That is, the laminated sedimentary layer is heated at a predetermined temperature under a non-oxidative atmosphere such as a vacuum atmosphere, an argon atmosphere, a nitrogen atmosphere, and a mixed atmosphere of nitrogen and hydrogen, for example. The heating temperature is preferably 150 to 700° C. The heating duration is preferably 0.5 to 10 hours.

A non-aqueous electrolyte secondary battery including the above negative electrode of the present invention is explained next.

A non-aqueous electrolyte secondary battery of the present invention comprises a positive electrode capable of electrochemically absorbing and desorbing Li, the above negative electrode, and a non-aqueous electrolyte.

The structure and the manufacturing method of the positive electrode are not particularly limited. General structure and manufacturing method can be applied. A positive electrode is typically obtained by applying a positive electrode material mixture paste onto a positive electrode current collector, drying the applied paste, and rolling the current collector carrying the positive electrode material mixture. The positive electrode material mixture paste is prepared by mixing a positive electrode active material mixture with a liquid component. The positive electrode material mixture may include a conductive agent and a binder.

For the positive electrode active material, a lithium-containing transition metal compound which is generally used in a lithium secondary battery is preferabe. The lithium-containing transition metal compound is typically exemplified by oxides such as $LiCoO_2$, $LiNiO_2$, $LiMn_2O_4$, and $LiMnO_2$. Additionally, oxides produced by replacing the transition metal element in these oxides with different metal element, for example, $LiCo_{1-x}Mg_xO_2$, $LiNi_{1-y}Co_yO_2$, and $LiNi_{1-y-z}Co_yMn_zO_2$ (where x, y, and z are positive numbers below 1) are preferably used as well.

In the positive electrode material mixture, carbon materials such as carbon black are preferably used as a conductive agent. For the binder, fluorocarbon resins such as polyvinylidene fluoride are used preferably. For the liquid component to disperse the material mixture, N-methyl-2-pyrrolidone (NMP) and the like are preferably used. For the positive electrode current collector, aluminum foil is preferably used. However, materials for these constituents are not limited to these examples.

The non-aqueous electrolyte desirably includes an organic solvent used generally in lithium secondary batteries, and a lithium salt that is soluble in the solvent. The non-aqueous electrolyte is prepared by dissolving the lithium salt in the organic solvent.

For the organic solvent, a mixed solvent of cyclic carbonates such as ethylene carbonate and propylene carbonate, and linear carbonates such as dimethyl carbonate, diethyl carbonate, and ethyl methyl carbonate are preferably used, though not limited thereto. As well, cyclic carboxylate such as γ-butyrolactone, linear carboxylate, and ethers such as dimethoxyethane are preferably used.

For the lithium salt, inorganic lithium-containing fluoride, a lithium imide compound, and the like are preferably used. For the inorganic lithium-containing fluoride, $LiPF_6$, $LiBF_4$, and the like can be mentioned. For a typical example of the lithium imide compound, $LiN(CF_3SO_2)_3$ can be mentioned. $LiClO_4$ or $LiCF_3SO_3$ may be mixed as well. A solid electrolyte in a gel state may also be used.

A separator is disposed between the positive electrode and the negative electrode, to prevent an internal short circuit. Any material can be used for the separator, as long as the non-aqueous electrolyte can pass through the material to an appropriate degree and the material prevents the positive electrode and the negative electrode from contacting each other. Generally, a microprous film comprising polyolefins such as polyethylene and polypropylene can be mentioned as an example of the separator material. The separator thickness is preferably 10 μm or more and 30 μm or less.

Shapes and structures of the non-aqueous electrolyte secondary battery of the present invention are not specifically limited. Shapes of a battery include cylindrical shape, flat shape, coin shape, and rectangular shape. The present invention may be applied to a battery of any shape. Exterior components of a battery include a metal battery can and a laminated film. The present invention can be applied to a battery sealed with any exterior component.

Examples and Comparative Examples of the present invention are explained next. However, Examples below are just to illustrate preferable embodiments of the present invention, and the present invention is not limited to Examples below.

Examples 1 to 25 and Comparative Examples 1 to 6

[Preparation of Buffer]

An electrolytic copper foil (10 μm in thickness, manufactured by FURUKAWA CIRCUIT FOIL Co., Ltd.) was used as a current collector of negative electrode. On this electrolytic copper foil, the first layer and the second layer were formed as in the following.

1. Plating Method

<i> Current Collector A

The surface of the electrolytic copper foil was washed with primary acetone (manufactured by KANTO CHEMICAL CO., INC.), and then subjected to an alkaline degreasing by using a degreasing agent, FA-100 (manufactured by KOJUNDO CHEMICAL LABORATORY CO., LTD.), for 5 minutes at 70° C. The copper foil after the degreasing was washed with running water, and then washed with 20% hydrochloric acid for a minute under room temperature.

The copper foil was further washed with running water, and then electroplated with Sn in tin borofluoride solution. The plating was carried out under the following conditions: the plating bath with the pH of 0.1 and the temperature of 25° C., and applied current density of 20 mA/cm². The copper foil was soaked in the plating bath for 30 seconds for electroplating with Sn, to form a Sn layer as a first layer.

The copper foil after the electroplating with Sn was washed with running water, and then electroplated with Ni in a Ni-sulfamic acid bath. The plating was carried out under the following conditions: the plating bath with the pH of 3.5 and the temperature of 50° C., and the applied current density of 30 mA/cm². The copper foil with the Sn layer was soaked in the plating bath for a minute for electroplating with Ni, to form a Ni layer as a second layer.

After washing the copper foil having the Sn layer and the Ni layer again, the copper foil was washed in primary ethanol (manufactured by KANTO CHEMICAL CO., INC.), and then dried by using a warm-air dryer with the temperature of 60° C.

The copper foil having a buffer comprising the Sn layer and the Ni layer thus obtained was named as a composite current collector A. When a cross section of the composite current collector A was observed by an EPMA, it was revealed that the thickness of the Sn layer per side was 0.7 µm, and the thickness of the Ni layer per side was 0.6 µm.

<ii> Current Collector B

A composite current collector B was obtained in the same manner as the composite current collector A, except that a Co-sulfuric acid bath was used instead of the Ni-sulfamic acid bath for electroplating the copper foil with Co to form a Co layer as a second layer. As for the conditions of the Co plating, the pH of the plating bath was set as 4.0, the temperature of the plating bath was set as 35° C., and the applied current density was set as 30 mA/cm$^2$. The soaking duration in the bath was set as 1 minute. When a cross section of the composite current collector B was observed with the EPMA, it was found that the thickness of the Co layer was 1.0 µm per side.

2. Vacuum Deposition Method

<i> Current Collector C

A hoop of electrolytic copper foil was placed in a vacuum deposition apparatus having two electron-beam guns. In a graphite crucible to which a first electron-beam gun is applied, a Sn ingot (manufactured by KOJUNDO CHEMICAL LABORATORY CO., LTD., 99.99% purity) was placed, and in a graphite crucible to which a second electron-beam gun is applied, a Ni ingot (manufactured by Furuuchi Chemical Corporation, 99.99% purity) was placed.

The first electron-beam gun was used to apply an electron-beam to the Sn ingot in the graphite crucible, to successively deposit Sn on one side of the electrolytic copper foil, while the foil was being rolled out from the hoop in a direction and then rolled up into a hoop, thereby forming a Sn layer as a first layer. In terms of conditions of the vacuum deposition, the acceleration voltage was set as −8 kV, the electric current was set as 100 mA, and the degree of vacuum in the apparatus was set as 3×10$^{-5}$ Torr. The rolling-out speed of the electrolytic copper foil was set as 20 cm/min.

Then, the second electron-beam gun was used to apply an electron-beam to the Ni ingot in another graphite crucible, to successively deposit Ni on the Sn layer on the electrolytic copper foil, while the foil was being rolled out from the hoop in a direction and then rolled up into a hoop, thereby forming a Ni layer as a second layer. At this time, the acceleration voltage was set as −8 kV, electric current was set as 150 mA, the degree of vacuum in the apparatus was set as 3×10$^{-5}$ Torr as in the previous deposition. The rolling-out speed of the electrolytic copper foil was set as 20 cm/min.

Further, Sn and Ni are deposited under the same conditions as in the above for another side of the electrolytic copper foil.

The copper foil having a buffer comprising the Sn layer and the Ni layer thus obtained was named a composite current collector C. When a cross section of the composite current collector C was observed by the EPMA, it was found that the thickness of the Sn layer per side was 0.9 µm, and the thickness of the Ni layer per side was 0.9 µm.

<ii> Current Collector D

A composite current collector D was obtained in the same manner as the composite current collector C, except that an In ingot (manufactured by Furuuchi Chemical Corporation, 99.9% purity) was placed instead of the Sn ingot in a graphite crucible to which a beam is applied by a first electron-beam gun, and the electric current was changed to 65 mA, to form an In layer as a first layer. When a cross section of the composite current collector D was observed with the EPMA, it was found that the thickness of the In layer per side was 0.8 µm, and that the thickness of the Ni layer per side was 0.8 µm.

3. Sputtering Method

<i> Current Collector E

A hoop of electrolytic copper foil was placed in a bipolar RF sputtering apparatus, which can carry out successive sputtering.

An Al target (manufactured by KOJUNDO CHEMICAL LABORATORY CO., LTD., 99.99% purity) was processed with Ar as a sputter gas (flow rate 150 sccm), to successively deposit Al on one side of the electrolytic copper foil, while the foil was being rolled out from the hoop in a direction and then rolled up into a hoop, thereby forming an Al layer as a first layer. The degree of vacuum was set as 3×10$^{-5}$ Torr in the apparatus. The rolling-out speed of the electrolytic copper foil was set as 10 cm/min. An Al layer was formed on the other side of the electrolytic copper foil as well, under the same conditions as the above.

Then, the Al target was changed to an Fe target (manufactured by Furuuchi Chemical Corporation, 99.99% purity), and Fe was deposited successively on the Al layer on the electrolytic copper foil under the same condition, while the foil was being rolled out from the hoop in a direction and then rolled up into a hoop, to form an Fe layer as a second layer. An Fe layer was formed on the other side of the electrolytic copper foil as well under the same conditions as above.

The copper foil with a buffer comprising the Al layer and the Fe layer thus obtained was named as a composite current collector E. When a cross section of the composite current collector E was observed with the EPMA, it was found that the thickness of the Al layer per side was 0.5 µm, and that the thickness of the Fe layer per side was 0.6 µm.

<ii> Current Collectors F to H

A Ti, V, or Cr target (all manufactured by Furuuchi Chemical Corporation, 99.99% purity) was used instead of the above Fe target, and Ti, V, or Cr was deposited successively on the Al layer on the electrolytic copper foil under the same conditions as above, while the foil was being rolled out from the hoop in a direction and then rolled up into a hoop, to form a Ti layer, a V layer, or a Cr layer as a second layer.

The copper foil with a buffer comprising the Al layer and the Ti layer thus obtained was named a composite current collector F, the copper foil with a buffer comprising the Al layer and the V layer was named a composite current collector G, and the copper foil with a buffer comprising the Al layer and the Cr layer was named a composite current collector H.

When cross sections of these composite current collectors were checked with the EPMA, it was found that the thickness of the second layer per side was 0.5 µm in the composite current collector F, 0.5 µm in the composite current collector G, and 0.6 µm in the composite current collector H.

[Formation of Active Material Portion]

A negative electrode was assembled by the combinations of the composite current collector, the active material, and the heating temperature shown in Tables 1 and 2. In each Example except Example 16, an active material portion was formed on a composite current collector, and then heated at a predetermined temperature under a vacuum atmosphere for 3 hours. In each Comparative Example except Comparative Example 4, an active material portion was formed on an electrolytic copper foil without buffer, and then heated at a predetermined temperature under a vacuum atmosphere for 3 hours. The temperature raising speed at the time of heating was 5° C./min in all Examples, and cooling was carried out by leaving the foil or the current collector as it is.

TABLE 1

| | Composite Current Collector | Active Material | Heating Temp. (° C.) | Battery Capacity (mAh) | Capacity Retention Rate (%) |
|---|---|---|---|---|---|
| Ex. 1 | A | Simple Substance of Si | 300 | 980 | 88 |
| Ex. 2 | B | Simple Substance of Si | 400 | 950 | 90 |
| Ex. 3 | C | Simple substance of Si | 300 | 970 | 89 |
| Ex. 4 | D | Simple substance of Si | 250 | 960 | 89 |
| Ex. 5 | E | Simple substance of Si | 500 | 950 | 88 |
| Ex. 6 | A | Si alloy | 300 | 890 | 92 |
| Ex. 7 | B | Si alloy | 400 | 880 | 91 |
| Ex. 8 | C | Si alloy | 300 | 890 | 90 |
| Ex. 9 | D | Si alloy | 250 | 880 | 90 |
| Ex. 10 | E | Si alloy | 500 | 870 | 91 |
| Ex. 11 | A | Si compound | 300 | 750 | 95 |
| Ex. 12 | B | Si compound | 400 | 740 | 94 |
| Ex. 13 | C | Si compound | 300 | 750 | 95 |
| Ex. 14 | D | Si compound | 250 | 750 | 93 |
| Ex. 15 | E | Si compound | 500 | 740 | 94 |
| Ex. 16 | A | Simple substance of Si | — | 1010 | 43 |
| Ex. 17 | A | Simple substance of Si | 150 | 1000 | 63 |
| Ex. 18 | A | Simple substance of Si | 450 | 950 | 90 |
| Ex. 19 | A | Simple substance of Si | 700 | 720 | 93 |
| Ex. 20 | A | Simple substance of Si | 1000 | 440 | 96 |
| Ex. 21 | F | Simple substance of Si | 600 | 960 | 90 |
| Ex. 22 | F | Si alloy | 600 | 870 | 92 |
| Ex. 23 | G | Simple substance of Si | 650 | 940 | 89 |
| Ex. 24 | G | Si alloy | 650 | 860 | 91 |
| Ex. 25 | H | Si compound | 400 | 750 | 94 |

TABLE 2

| | Current collector | Active Material | Heating Temp. (° C.) | Battery Capacity (mAh) | Capacity Retention Rate (%) |
|---|---|---|---|---|---|
| Com. Ex. 1 | Electrolytic copper foil | Simple substance of Si | 400 | 790 | 58 |
| Com. Ex. 2 | Electrolytic copper foil | Si alloy | 400 | 680 | 67 |
| Com. Ex. 3 | Electrolytic copper foil | Si compound | 400 | 600 | 71 |
| Com. Ex. 4 | Electrolytic copper foil | Simple substance of Si | — | 1050 | 23 |
| Com. Ex. 5 | Electrolytic copper foil | Simple substance of Si | 150 | 1030 | 36 |
| Com. Ex. 6 | Electrolytic copper foil | Simple substance of Si | 600 | 480 | 88 |

The formation of the active material portion is described in the following.

A. Simple Substance of Si

For an active material comprising a simple substance of Si, the vacuum deposition apparatus used for the formation of buffer in the above "2.vacuum deposition method" was used to form a film of simple substance of Si on a composite current collector or on an electrolytic copper foil without buffer as in the following.

Herein, a Si ingot (manufactured by Furuuchi Chemical Corporation, 99.999% purity) was placed in a graphite crucible, and an electron-beam was applied to the Si ingot by an electron-beam gun, to deposit Si on one side of the composite current collector, while the composite current collector was being rolled out from the hoop in a direction and then rolled up into a hoop, thereby forming a Si layer as an active material portion. At the time of the deposition, the acceleration voltage was set as −8 kV, the electric current was set as 150 mA, and the degree of vacuum in the apparatus was set as $3 \times 10^{-5}$ Torr. The rolling-out speed of the composite current collector was set as 10 cm/min. A Si layer was formed on the other side of the composite current collector as well, under the same conditions as above.

The combination of the Si layer thus obtained and the buffer comprising the first layer and the second layer corresponds to the above laminated sedimentary layer. Then, the laminated sedimentary layers and the electrolytic copper foil carrying the laminated sedimentary layers were heated at the predetermined temperatures shown in Tables 1 and 2 under a vacuum atmosphere for 3 hours, to form a negative electrode.

When the X-ray diffraction measurement was carried out for each negative electrode, in the X-ray diffraction spectrum of the negative electrode with buffer, a crystalline peak attributed to Cu in the current collector, and a crystalline peak attributed to metal elements forming the first layer and the second layer were observed. Further, a broad halo pattern was observed in the range of $2\theta=15$ to $40°$. When a polished cross section of each negative electrode was observed, it was found that the thickness of the active material portion was about 4 μm per side. The result of the X-ray diffraction measurement revealed that the active material portion was amorphous.

B. Si alloy

For an active material comprising Si alloy, the above vacuum deposition apparatus used for the formation of buffer in the above "2.Vacuum Deposition Method" was used to form a film of a Si alloy on the composite current collector or on the electrolytic copper foil without buffer, as in the following.

Herein, a Ti-Si alloy (Si:Ti=90:10 (weight ratio)) made by melting was placed in a graphite crucible, and an electron-beam was applied to the Ti-Si alloy by an electron-beam gun to deposit a Si alloy on one side of the composite current collector, while the current collector was rolled out from the hoop in a direction and then rolled up into a hoop, thereby forming a Ti-Si alloy layer as an active material portion. At the time of the deposition, the acceleration voltage was set as −8 kV, the electric current was set as 200 mA, and the degree of vacuum was set as $3 \times 10^{-5}$ Torr. The rolling-out speed of the composite current collector was set as 5 cm/min. A Ti-Si alloy layer was formed on the other side of the composite current collector as well under the same conditions as the above.

The combination of the Ti-Si alloy layer thus formed and the buffer comprising the first layer and the second layer corresponds to the above laminated sedimentary layer. Then, the laminated sedimentary layers and the electrolytic copper foil carrying the laminated sedimentary layers were heated together at the predetermined temperatures shown in Tables 1 and 2 under a vacuum atmosphere for 3 hours to form a negative electrode.

When the X-ray diffraction measurement were carried out for each negative electrode, in the X-ray diffraction spectrum of the negative electrode with buffer, a crystalline peak attributed to Cu in the current collector, and a crystalline peak attributed to metal elements forming the first layer and the second layer were observed. Further, a broad halo pattern and a peak attributed to $TiSi_2$ were observed in the range of $2\theta=15$ to $40°$.

The crystal grain (crystallite) size of $TiSi_2$ calculated from the half width of the peak with the largest intensity among the peaks attributed to $TiSi_2$, and the Scherrer formula was about 15 nm. It was also found that $TiSi_2$ was in a micro crystalline state. When a polished cross section of each negative electrode was observed, it was found that the thickness of the active material portion was about 7 μm per side. Further, at a polished cross section of the negative electrode, a crystal grain of $TiSi_2$ with a particle size of about 15 nm was observed.

C. Si compound

For an active material comprising a Si compound as well, the vacuum deposition apparatus used in the formation of the buffer in the above "2.vacuum deposition method" was used to form a film of the Si compound on the composite current collector or on the electrolytic copper foil without buffer, as in the following.

Herein, SiO tablets (manufactured by SUMITOMO TITANIUM CORPORATION, 99.9% purity) were placed in the graphite crucible, and the graphite crucible was heated by a resistance heating, to control the temperature of the crucible to become $1050±30°$ C. SiO was deposited on one side of the composite current collector, while the composite current collector being rolled out from the hoop to a direction and then rolled up into a hoop, thereby forming a SiO layer as an active material portion. The degree of vacuum in the apparatus was set as $3\times10^{-5}$ Torr. The rolling-out speed of the composite current collector was set as 20 cm/min. A SiO layer was formed on the other side of the composite current collector as well, under the same conditions as above.

The combination of the SiO layer thus obtained, and the buffer comprising the first layer and the second layer corresponds to the above laminated sedimentary layer. Then, the laminated sedimentary layers and the electrolytic copper foil carrying the laminated sedimentary layers were heated together at the predetermined temperatures shown in Tables 1 and 2 under a vacuum atmosphere for 3 hours, to form a negative electrode.

When the X-ray diffraction measurement for each negative electrode were carried out, in the X-ray diffraction spectrum of the negative electrode with buffer, a crystalline peak attributed to Cu in the current collector, and a crystalline peak attributed to metal elements forming the first layer and the second layer were observed. Further, a broad halo pattern was observed in the range of $2\theta=15$ to $40°$. Additionally, when a polished cross section of each negative electrode was observed, it was found that the thickness of the active material portion was about 15 μm per side.

[Fabrication of Lithium Secondary Battery]

Figure 2:
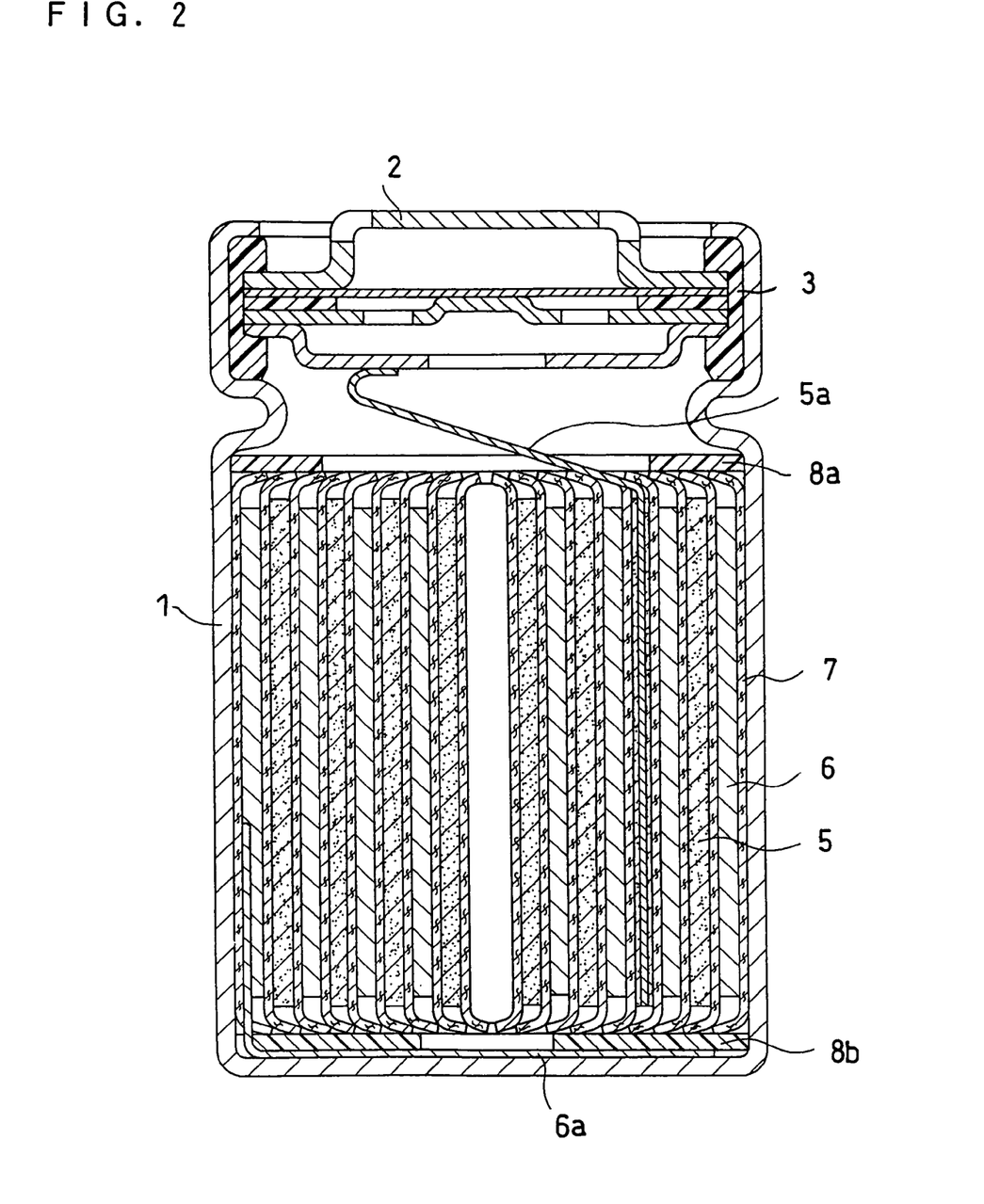
FIG. 2 is a vertical cross section of a cylindrical battery of an Example of the present invention.

The above negative electrodes were cut to give a strip of a predetermined size, and a cylindrical lithium secondary battery as shown in FIG. 2 was fabricated by using these negative electrodes, as in the following.

(i) Fabrication of Positive Electrode $Li_2CO_3$ and $CoCO_3$ were mixed at a predetermined mole ratio, and heated at $950°$ C. to produce $LiCoO_2$ as a positive electrode active material. The $LiCoO_2$ was classified into the size of not more than 45 μm for the usage. To 100 parts by weight of the positive electrode active material, 5 parts by weight of acetylene black as a conductive agent, 4 parts by weight of polyvinylidene fluoride as a binder, and an appropriate amount of N methyl-2-pyrrolidone as a dispersion medium were added, and then mixed sufficiently, to obtain a positive electrode material mixture paste.

The positive electrode material mixture paste was applied on both sides of a current collector comprising an aluminum foil with a thickness of 15 μm, and then dried. Subsequently, the current collector carrying the positive electrode material mixture was rolled and cut to give a strip with a predetermined size, thereby obtaining a positive electrode.

(ii) Preparation of Non-Aqueous Electrolyte

To a solvent mixture in which ethylene carbonate and diethyl carbonate were mixed at a volume ratio of 1:1, lithium hexafluorophosphate was dissolved at a concentration of 1 mol/L to obtain a non-aqueous electrolyte.

(iii) Battery Assembly

To the current collector of the positive electrode 5, one end of a positive electrode lead 5a made of aluminum was connected, and to the current collector of the negative electrode 6, one end of a negative electrode lead 6a made of nickel was connected. Afterwards, a positive electrode 5 and a negative electrode 6 were wound interposing a separator 7 comprising a microporous film made of polyethylene resin and being wider than the both electrode plates, to form an electrode plate assembly.

The outer face of the electrode plate assembly was wrapped with the separator 7. On the top and the bottom of this electrode plate assembly, an upper insulating ring 8a and a lower insulating ring 8b were disposed respectively, and then the assembly with the rings disposed was housed in an inner space of a battery can 1. Subsequently, the non-aqueous electrolyte was injected in the battery can, to impregnate the electrode plate assembly with the electrolyte. The other end of the positive electrode lead 5a was welded to the inner side of a sealing plate 2, to the periphery of which an insulating packing 3 was disposed. The other end of the negative electrode lead 6a was welded to the inner bottom face of the battery can. Finally, the opening of the battery can 1 was sealed with the sealing plate 2. A cylindrical lithium secondary battery was thus obtained.

[Battery Evaluation]

(i) Discharge Capacity

In a constant temperature room of $20°$ C., a constant electric current charge was carried out for each cylindrical battery at a charging electric current of 0.2 C (1 C=an hour rate electric current) till the battery voltage reached 4.05 V, and then a constant voltage charge was carried out at 4.05 V till the electric current reached 0.01 C. Afterwards, the cylindrical battery was discharged at the electric current of 0.2 C till the battery voltage reached 2.5 V. The discharge capacity at this time is shown in Tables 1 and 2.

(ii) Cycle Life

In a constant temperature room of $20°$ C., the charge and discharge cycle was repeated under the following conditions for each battery after the above measurement of discharge capacity.

A cycle of the following was repeated: A constant electric current charge was carried out at an electric current of 1 C until the battery voltage reached 4.05 V; a constant voltage charge was carried out at 4.05 V until the electric current value reached 0.05 C; and the cylindrical battery was discharged at the electric current of 1 C until the battery voltage reached 2.5 V. The discharge capacity of the 100th cycle relative to the discharge capacity of the 2nd cycle was obtained by percentage, and named as the capacity retention rate(%). The results are shown in Tables 1 and 2. The higher capacity retention rate with the numeral value near 100% signifies the better cycle life.

[Results Evaluation]

The batteries (Examples 1 to 15, 18, and 21 to 25), in which current collectors A to H were used and the negative electrodes heated at appropriate temperatures were used, showed a great improvement in the charge and discharge cycle characteristics compared with the batteries in which the negative electrodes shown in the comparative examples 1 to 6 were used.

The battery in which the negative electrode was not heated (Example 16), and the battery in which the heating temperature was low (Example 17), had a higher capacity compared with the batteries in other Examples, but the capacity retention rate tended to decrease. The batteries which were heated at a higher temperature (Examples 19 and 20) showed good charge and discharge cycle characteristics, but the battery capacities decreased.

When each battery was disassembled after the measurement of cycle life to analyze its internal conditions, especially the conditions of the negative electrode, it was found that in the batteries of comparative examples 4 and 5, the active material portions of the negative electrode were mostly separated from the current collector, and further embedded into the separator. In comparative examples 1 to 3 as well, it was confirmed that the active material portion separated from the current collector in non-uniform fashion. This is probably due to the fact that the bond between the current collector and the active material portion was established non-uniformly at the time of heating. In the batteries of Examples 16 and 17 as well, the separation of the active material portion of the negative electrode from the current collector was confirmed, but the separation was of a practically usable degree.

In the batteries of Examples 1 to 15, and 18 to 20, almost no separation of the active material portion was found, and almost no embedding of the active material in the separator was found, signifying excellent conditions of both negative electrode and separator.

From the above results, it was revealed that according to the present invention, a separation of the active material portion from the current collector can be suppressed in a negative electrode just by adding a simple heating process, and further, a non-aqueous electrolyte secondary battery with excellent charge and discharge cycle characteristics could be obtained.

Examples 26 to 33 and Comparative Examples 7 to 8

Composite current collectors having a first layer (Sn layer) and a second layer (Ni layer) with various thicknesses as shown in Table 3 were prepared in the same manner as the above composite current collector A, except that the duration of the soaking of the copper foil (current collector) or the copper foil having the Sn layer in each electroplating bath were changed. However, in Comparative Example 7, the second layer was not formed, and in Comparative Example 8, the first layer was not formed.

On the obtained composite current collector, a layer of the simple substance of Si was formed as an active material portion as in Example 1, and the current collector with the layer was heated under a vacuum atmosphere at 300° C. for 3 hours, to form a negative electrode.

Cylindrical lithium secondary batteries were fabricated in the same manner as Example 1, except that the negative electrode thus obtained was used, and then evaluated in the same manner. The results are shown in Table 3.

TABLE 3

| | Current Collector | First Layer (Sn layer) | Second Layer (Ni layer) | Active Material | Heating Temp. (° C.) | Battery Capacity (mAh) | Capacity Retention Rate (%) |
|---|---|---|---|---|---|---|---|
| Com. Ex. 7 | Electrolytic Copper Foil | 1.0 | 0.0 | Simple substance of Si | 300 | 1030 | 60 |
| Com. Ex. 8 | Electrolytic Copper Foil | 0.0 | 1.1 | Simple substance of Si | 300 | 1020 | 51 |
| Ex. 26 | Electrolytic Copper Foil | 0.1 | 0.1 | Simple substance of Si | 300 | 990 | 83 |
| Ex. 27 | Electrolytic Copper Foil | 0.9 | 1.0 | Simple substance of Si | 300 | 960 | 91 |
| Ex. 28 | Electrolytic Copper Foil | 1.0 | 0.2 | Simple substance of Si | 300 | 970 | 90 |
| Ex. 29 | Electrolytic Copper Foil | 0.1 | 1.1 | Simple substance of Si | 300 | 970 | 91 |
| Ex. 30 | Electrolytic Copper Foil | 1.1 | 3.0 | Simple substance of Si | 300 | 920 | 91 |
| Ex. 31 | Electrolytic Copper Foil | 3.0 | 1.0 | Simple substance of Si | 300 | 930 | 90 |
| Ex. 32 | Electrolytic Copper Foil | 0.9 | 5.1 | Simple substance of Si | 300 | 710 | 91 |
| Ex. 33 | Electrolytic Copper Foil | 4.9 | 1.0 | Simple substance of Si | 300 | 730 | 88 |

From the results of Table 3, it can be concluded that the buffer needs to include both the first layer and the second layer, in view of the capacity retention rate. Also, it can be concluded that preferable battery performance can be obtained when the thicknesses of the first layer and the second layer are 0.1 µm or more and 3 µm or below. Additionally, it was revealed that battery capacity declines when a thick layer of over 3 µm is formed as the first layer or the second layer.

Comparative Examples 9 to 14

A hoop of electrolytic copper foil was placed in the bipolar RF sputtering apparatus used in preparation of the above composite current collector E. Then, a Mo target (manufactured by Furuuchi Chemical Corporation, 99.99% purity) was processed by a sputter gas of Ar (flow rate 10 sccm), to successively deposit Mo on one side of the electrolytic copper foil, while the foil was rolled out from the hoop in a direction and then rolled up into a hoop, to form a Mo layer. The degree of vacuum in the apparatus was set as 3×10⁻⁵ Torr. The rolling-out speed of the electrolytic copper foil was set as 10 cm/min. A Mo layer was formed on the other side of the electrolytic copper foil as well, under the same conditions as above. Copper foil with the Mo layer thus obtained was named as a composite current collector F.

A hoop of electrolytic copper foil was placed in the bipolar RF sputtering apparatus used in the preparation of the above composite current collector E. Then, a W target (manufactured by Furuuchi Chemical Corporation, 99.99% purity) was processed with a sputtering gas of Ar (flow rate 10 sccm), to successively deposit W on one side of the electrolytic copper foil, while the foil was rolled out from the hoop in a direction and then rolled up into a hoop, thereby forming a W layer. The degree of vacuum in the apparatus was set as 3×10⁻⁵ Torr. The rolling-out speed of the electrolytic copper foil was set as 10 cm/min. A W layer was formed on the other side of the electrolytic copper foil as well under the same conditions as above. A copper foil with the W layer thus obtained was named as a composite current collector G.

On the obtained composite current collector, the layer of the simple substance of Si was formed as an active material portion, as in Example 1, and subsequently, in Comparative Examples 11 to 14, the heating under a vacuum atmosphere at temperatures shown in Table 4 for 3 hours was carried out to form a negative electrode. In Comparative Examples 9 and 10, the heating was not carried out.

When a polished cross sections of the negative electrode after heating were observed, in comparative examples 13 and 14 in which the heating at 800° C. or more was carried out, it was revealed that Si as an active material and Mo or W formed a metallic bond. However, from the results of the X-ray diffraction measurement, it was revealed that the active material was completely changed to crystalline.

Cylindrical lithium secondary battery were fabricated in the same manner as Example 1, except that the negative electrode thus obtained was used, and evaluated in the same manner. The results are shown in Table 4.

TABLE 4

| | Composite Current Collector | Heating Temp. (° C.) | Battery Capacity (mAh) | Capacity Retention Rate (%) |
|---|---|---|---|---|
| Com. Ex. 9 | F | — | 1010 | 25 |
| Com. Ex. 10 | G | — | 1020 | 23 |
| Com. Ex. 11 | F | 300 | 890 | 27 |
| Com. Ex. 12 | G | 300 | 910 | 28 |
| Com. Ex. 13 | F | 800 | 750 | 18 |
| Com. Ex. 14 | G | 800 | 760 | 20 |

The results of Table 4 reveal that in the Comparative Examples 9 to 12 in which the active material was not adhered to the Mo layer or the W layer of the current collector surface, battery with a relatively high capacity but a short cycle life was obtained. When these batteries were disassembled to observe the conditions of the negative electrode, it was found that Si was mostly separated from the current collector. Additionally, in Comparative Examples 13 and 14, the active material expanded to the degree noticeable to the eyes, and particles were cracked.

Other than the above Mo and W, in the case where only the film of the other transition metal element was formed on the current collector surface as well, almost the same results were obtained. From these results, it can be concluded that the buffer needs to have both the first layer and the second layer.

The present invention is applicable to a non-aqueous electrolyte secondary battery in any form. Therefore, the present invention can be applied to batteries with various shapes, such as a coin-shape, a rectangular-shape, and a flat-shape, and not to be limited to the cylindrical lithium secondary battery mentioned in Examples. The present invention can be also applied to a battery having an electrode assembly of various form, such as wound-type, and laminated-type. A non-aqueous electrolyte secondary battery of the present invention is useful for a main power source of a mobile communication tools, mobile electronic devices, and the like.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A negative electrode for a non-aqueous electrolyte secondary battery, comprising: an active material portion capable of electrochemically absorbing and desorbing Li, a current collector carrying said active material portion, and a buffer interposed between said active material portion and said current collector, said active material portion comprising at least one selected from the group consisting of a Si simple substance, a Si alloy, and a Si compound, said current collector comprising Cu, said buffer comprising a first layer being in contact with said current collector, said first layer including a group A element which is at least one selected from the group A consisting of Sn, Al, and In, and a second layer being in contact with said active material portion, said second layer including a group B element which is at least one selected from the group B consisting of transition metal elements other than Cu.

2. The negative electrode in accordance with claim 1, wherein said first layer includes at least Sn as said group A element, and said second layer includes at least Ni as said group B element.

3. The negative electrode in accordance with claim 2, wherein said first layer includes a phase comprising Cu and said Sn, said Cu being diffused from said current collector to said first layer.

4. The negative electrode in accordance with claim 2, wherein said second layer includes a phase comprising Si and said Ni, said Si being diffused from said active material portion to said second layer.

5. A non-aqueous electrolyte secondary battery, comprising: a positive electrode capable of electrochemically absorbing and desorbing Li, a negative electrode, and a non-aqueous electrolyte, said negative electrode comprising an active material portion capable of electrochemically absorbing and desorbing Li, a current collector carrying said active material portion, and a buffer interposed between said active material portion and said current collector, said active material portion comprising at least one selected from the group consisting of a Si simple substance, a Si alloy, and a Si compound, said current collector comprising Cu,
said buffer comprising
a first layer being in contact with said current collector, said first layer including a group A element which is at least one selected from the group A consisting of Sn, Al, and In, and a second layer being in contact with said active material portion, said second layer including a group B element which is at least one selected from the group B consisting of transition metal elements other than Cu.

* * * * *